United States Patent [19]
Leu et al.

[11] Patent Number: 5,523,936
[45] Date of Patent: Jun. 4, 1996

[54] BUILT-IN INPUT FILTER FORWARD CONVERTER

[75] Inventors: Ching-Shan Leu, Taoyuan; Jiun-Bin Hwang, Taoyuan Hsien, both of Taiwan

[73] Assignee: Chun-Shan Institute of Science and Technology, Taiwan

[21] Appl. No.: 279,531

[22] Filed: Jul. 25, 1994

[51] Int. Cl.⁶ .............................. H02M 3/335; G05F 1/40
[52] U.S. Cl. .................................. 363/21; 323/282
[58] Field of Search .................................. 323/222, 223, 323/251, 282, 309, 311; 363/19, 21

[56] References Cited

U.S. PATENT DOCUMENTS

| | | | |
|---|---|---|---|
| 4,635,176 | 1/1987 | Hishiki et al. | 363/21 |
| 4,670,667 | 6/1987 | Petit | 327/482 |
| 5,301,095 | 4/1994 | Teramoto et al. | 363/21 |
| 5,313,381 | 5/1994 | Balakrishnan | 363/147 |
| 5,349,514 | 9/1994 | Ushiki et al. | 363/21 |

OTHER PUBLICATIONS

A Novel Forward Configuration for DC–DC Application: Built–in Input Filter Forward Converter (BIFFC), Leu et al., IEEE Dalas, Texas, Mar. 1995.

*Primary Examiner*—Matthew V. Nguyen
*Attorney, Agent, or Firm*—Hedman, Gibson & Costigan

[57] ABSTRACT

A built-in input filter forward converter performs to shape an input current to a non-pulsating fashion. Shaping action is obtained by placing two cross-coupled capacitors to a plurality of splitting windings of a power transformer such that the input current will not be interrupted. The cross-coupled capacitors also operate as a lossless snubber by allowing the leakage inductance energy to be stored and recovered during normal operation. Thus significant improvements of reducing harmonic of the input current, input current ripple, and increasing the converter's efficiency are achieved.

3 Claims, 6 Drawing Sheets

5,523,936

BUILT-IN INPUT FILTER FORWARD CONVERTER

BACKGROUND OF THE INVENTION

1. Field of the Invention

The present invention relates to a built-in input filter forward converter, and more particularly to a converter that exhibits non-pulsating input current.

2. Description of the Prior Art

Pulse-width modulation, quasi-resonant, multi-resonant and pulse-width modulation zero-voltage-transition forward converters have been proposed in the prior art to provide output voltage despite changes in load or input voltage. See [1] K. H. Liu and F. C. Lee, "Secondary-Side Resonance for High-Frequency Power Conversion," IEEE Applied Power and Electronics Conference Proc., 1986, pages 83–89. [2] W. A. Tabisz and F. C. Lee, "A Novel Zero-Voltage-Switched Multi-Resonant Forward Converter," High Frequency Power Conversion Conference Proc., 1988, pages 309–318. [3] H. J. Kim, C. S. Leu, R. Farrington, and F. C. Lee, "Clamp Mode Zero-Voltage-Switched Multi-Resonant Converters," IEEE Power Electronics Conference Record, 1992, pages 78–84. [4] G. Hua, C. S. Leu, and F. C. Lee, "Novel Zero-Voltage-Transition PWM Converters," IEEE Power Electronics Conference Record, 1992, pages 55–61.

A controller varies the duty cycle at a power MOSFET which is turned on and off in order to maintain constant the DC load voltage. Hence, a pulsating input current flows from power source. A typical example of this is a conventional prior art tertiary-winding forward converter shown in FIG. 8, where a transformer comprises two identical primary windings and a secondary winding with 1:1:N turns ratio, and "N" is a positive integer. FIG. 9 shows the key waveforms in the operation of the tertiary-winding forward converter of FIG. 8. As seen from FIG. 9, pulsating current results in getting a higher RMS value to cause additional losses and generating undesired current harmonics in the source. An input filter stage is thus required to alleviate those problems.

The present invention has arisen to mitigate and/or obviate the afore-described disadvantages of the conventional forward converter.

SUMMARY OF THE INVENTION

The primary objective of the present invention is to provide an improved built-in input filter forward converter (BIFFC) topology that reduces ripple and harmonics of an input current.

Briefly, this invention contemplates improving the performance of the forward converter by shaping the input current obtained by placing two capacitors (referred to as cross-coupled capacitor) to the splitting windings of the power transformer such that the input current can flow through the current path provided by the cross-coupled capacitor during the turning off of the switch.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
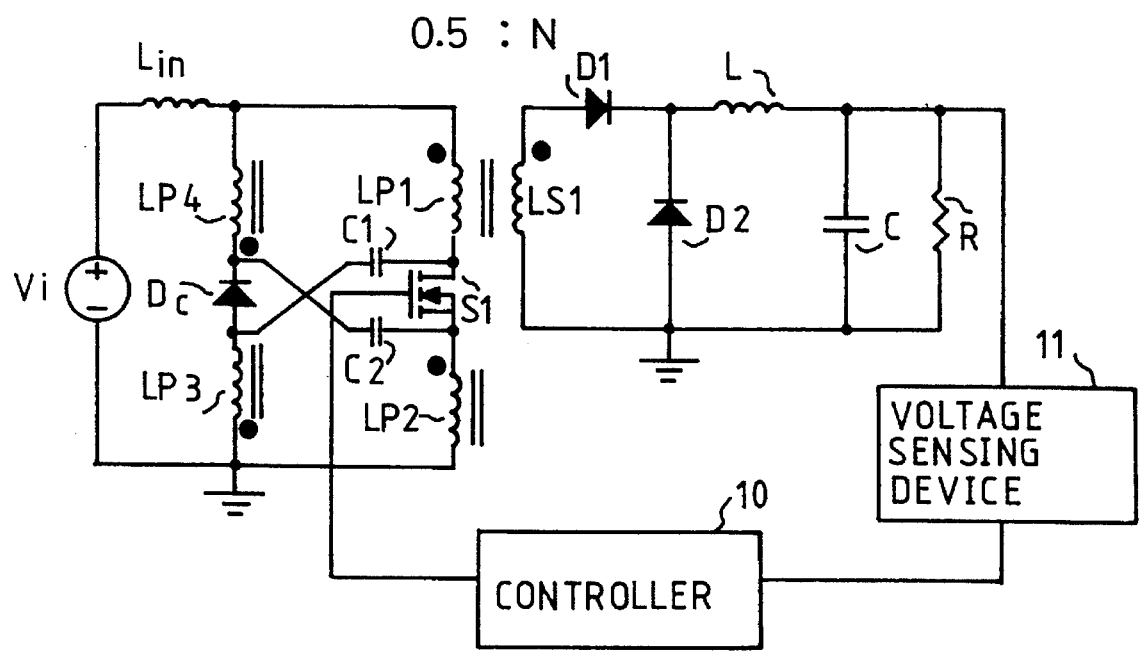
FIG. 1 is a schematic diagram of a built-in input filter forward converter (BIFFC) in accordance with the present invention.
Figure 8:
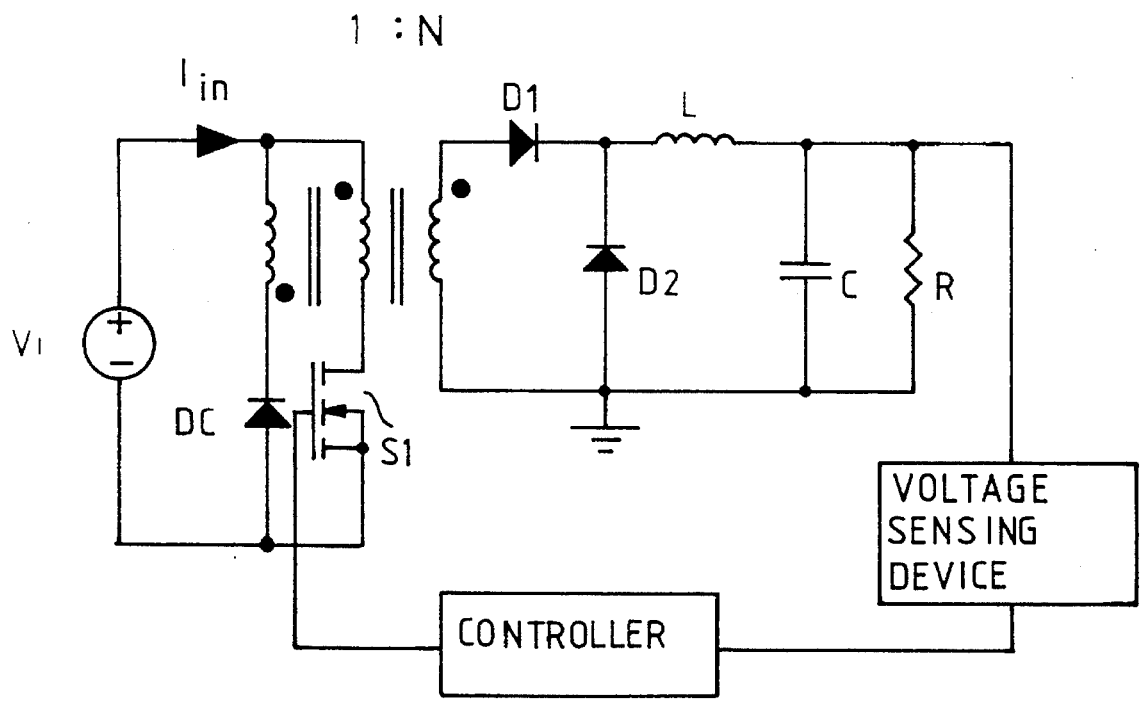
FIG. 8 is a schematic diagram of a prior art tertiary-winding forward converter.
Figure 9:
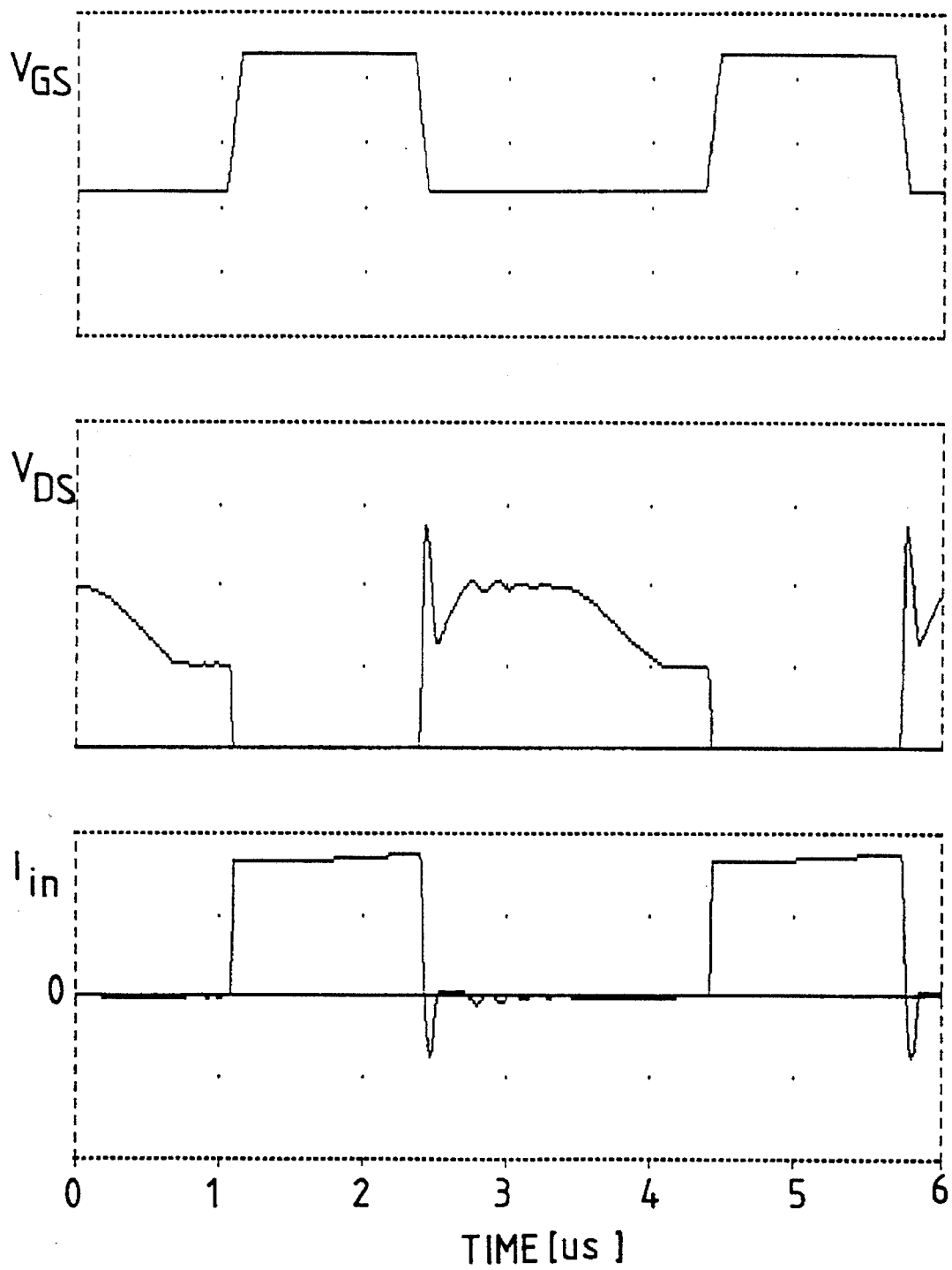
FIG. 9 is a diagram showing certain waveforms of the circuit of FIG. 8.

Referring now to the drawings, and more particularly to FIG. 1, a built-in input filter forward converter (BIFFC) in accordance with the present invention is illustrated. A primary side of the power stage in this converter comprises a switch S1, a clamped diode $D_c$, two cross-coupled capacitors $C_1$ and $C_2$, and a transformer. The transformer comprises four identical primary windings $L_{P1}$, $L_{P2}$, $L_{P3}$, and $L_{P4}$, and a secondary winding $L_{S1}$ with 0.5:0.5:0.5:0.5:N turns ratio. The number "0.5" herein is compared relative to the turns ratio "1:1:N" of the transformer of FIG. 8, i.e., the two primary windings of FIG. 8 are split into two further windings. An input filter inductor $L_{in}$ is defined as the leakage inductance of the transformer and any stray inductance between an input source $V_i$ and the primary windings $L_{P1}$, $L_{P2}$, $L_{P3}$, and $L_{P4}$ of the transformer.

The operation of the BIFFC is different from that of the prior art tertiary-winding forward converter shown in FIG. 8.

Figure 2:
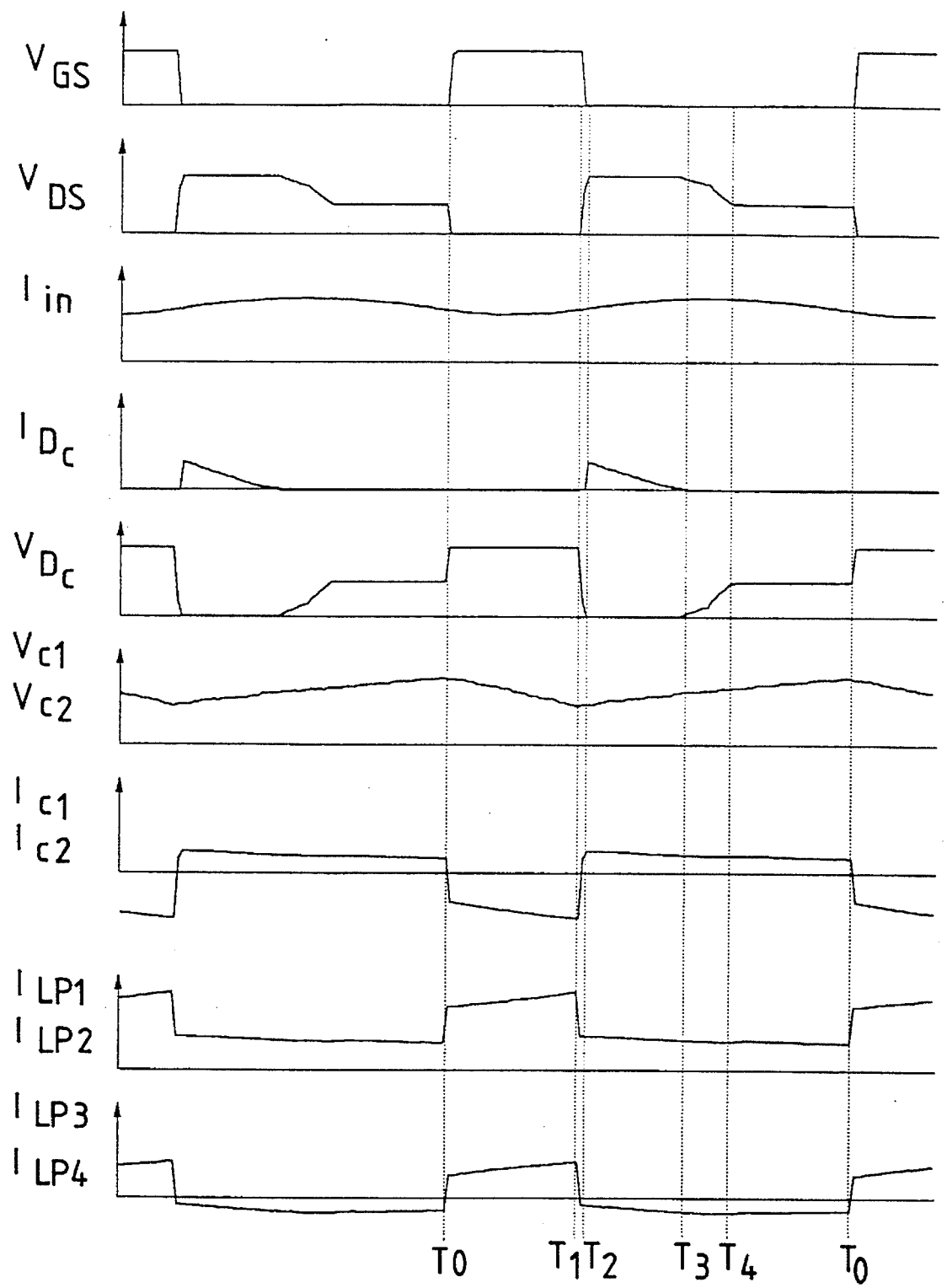
FIG. 2 is a diagram showing certain waveforms of the circuit of FIG. 1.

A controller 10 alternately and periodically turns on and turns off a power switch S1. The power switch S1 in this embodiment is an N-type MOSFET. The frequency is fixed and the variable duty cycle is a function of the DC voltage applied to the load R as detected by a voltage sensing device 11. The controller 10 and the voltage sensing device 11 are conventional and well known and are not described in detail herein. In response to the input from the voltage sensing device 11, the controller 10 varies the duty cycle of the power switch $S_1$ so as to maintain constant the load voltage. The typical waveforms of this converter are shown in FIG. 2.

To simplify the analysis, the output filter inductance is sufficiently large to be approximated by a current source with a value equaling the output current $I_0$. The cross-coupled capacitor is assumed sufficiently large so that the voltage across it can be assumed constant. Under steady-state operation, five operation stages exist within one switching cycle as shown in FIGS. 3 to 7.

Figure 3:
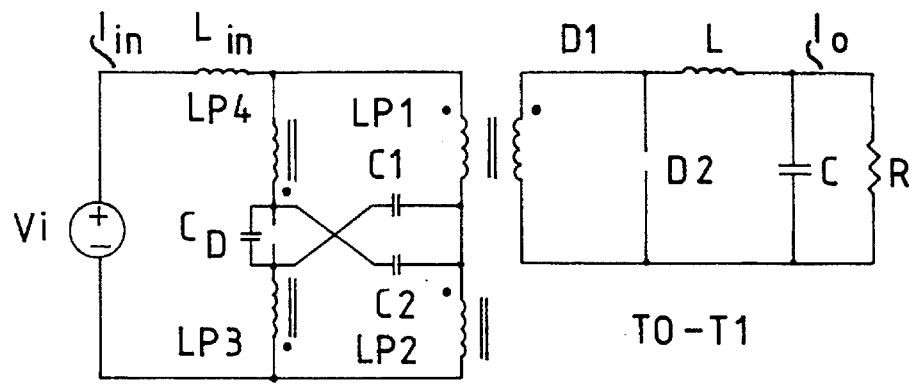
FIG. 3 is a first operation stage within one switching cycle of the circuit in FIG. 1.

Referring to FIG. 3, from $T_0$ to $T_1$ interval, i.e., immediately after a controller 10 turns on the power switch $S_1$, the forward diode $D_1$ is turned on and the freewheeling diode $D_2$ is turned off. Besides the main current loop to transfer the energy to the load via $L_{P1}$-$S_1$-$L_{P2}$, two additional circulating current loops $C_1$-$L_{P2}$-$L_{P3}$ and $C_2$-$L_{P4}$-$L_{P1}$ are formed in a resonant fashion to recover the energy from $C_1$ and $C_2$ to the load. A voltage $V_{DC}$ across the parasitic capacitance $C_D$ of the clamped diode $D_C$ increases up to $2V_i$ and remains constant during this time interval.

Figure 4:
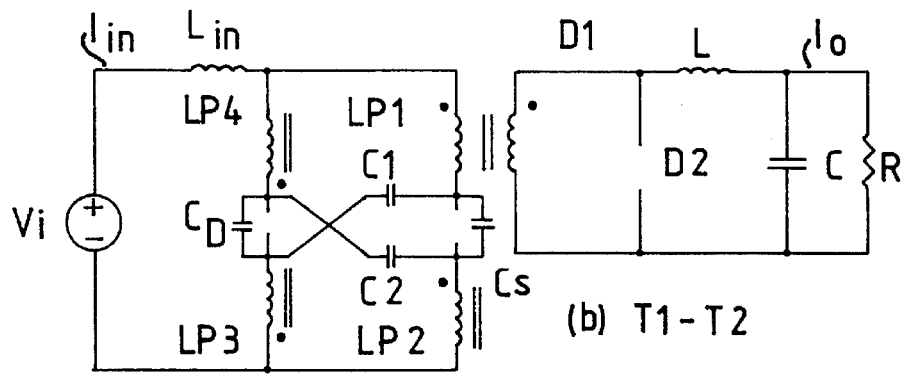
FIG. 4 is a second operation stage within one switching cycle of the circuit in FIG. 1.

Referring to FIG. 4, i.e., from time interval $T_1$ to $T_2$, the power switch S1 is turned off at T1. An equivalent capacitance Cs of the power switch S1 is linearly charged by a reflected filter inductor current $I_0/N$. When a drain-source voltage $V_{DS}$ of the power switch S1 reaches $V_i$, the forward diode $D_1$ is turned off and the freewheeling diode $D_2$ is turned on at the same time. During the interval $T_1$ to $T_2$, the drain-source voltage $V_{DS}$ of the power switch S1 ramps up to $2V_i$, the clamped diode $D_c$ is turned on, and the capacitors $C_1$ and $C_2$ are charged by the source current $i_{LP1}$ and $i_{LP2}$ through $L_{P1}$-$C_1$-$L_{P3}$ and $L_{P4}$-$C_2$-$L_{P2}$, respectively.

Figure 5:
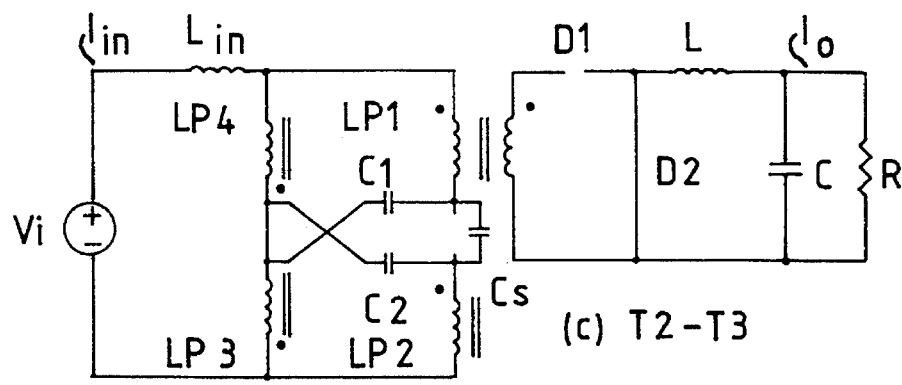
FIG. 5 is a third operation stage within one switching cycle of the circuit in FIG. 1.

Referring to FIG. 5, i.e., from time interval $T_2$ to $T_3$, the clamped diode $D_C$ remains in an "ON" status and the drain-source voltage $V_{DS}$ is thus clamped to $2V_i$.

Figure 6:
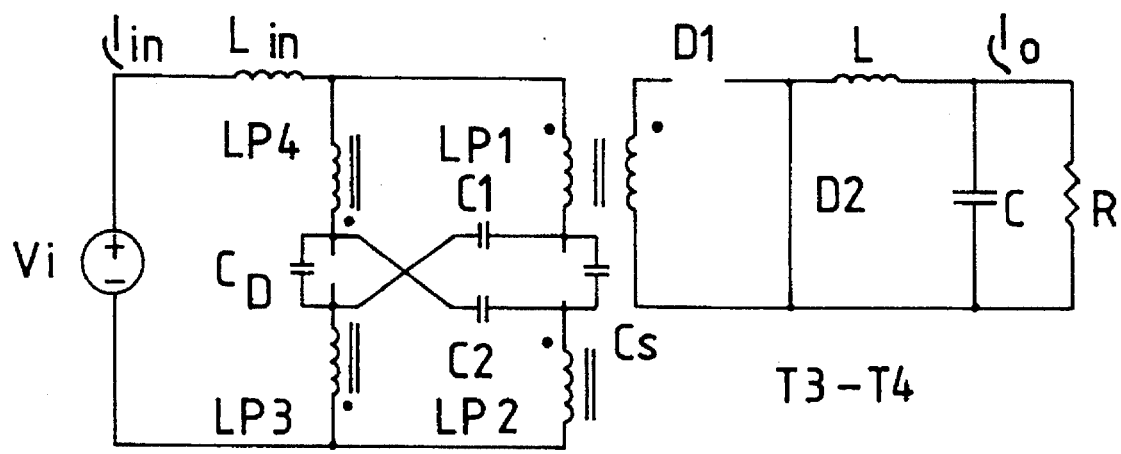
FIG. 6 is a fourth operation stage within one switching cycle of the circuit in FIG. 1.

Referring to FIG. 6, i.e., from time interval $T_3$ to $T_4$, the clamped diode $D_c$ is turned off at $T_3$. This interval ends at $T_4$, when the voltage $V_{DS}$ decreases from $2V_i$ to $V_i$ and the voltage $V_{DC}$ ramps up to $V_i$.

Figure 7:
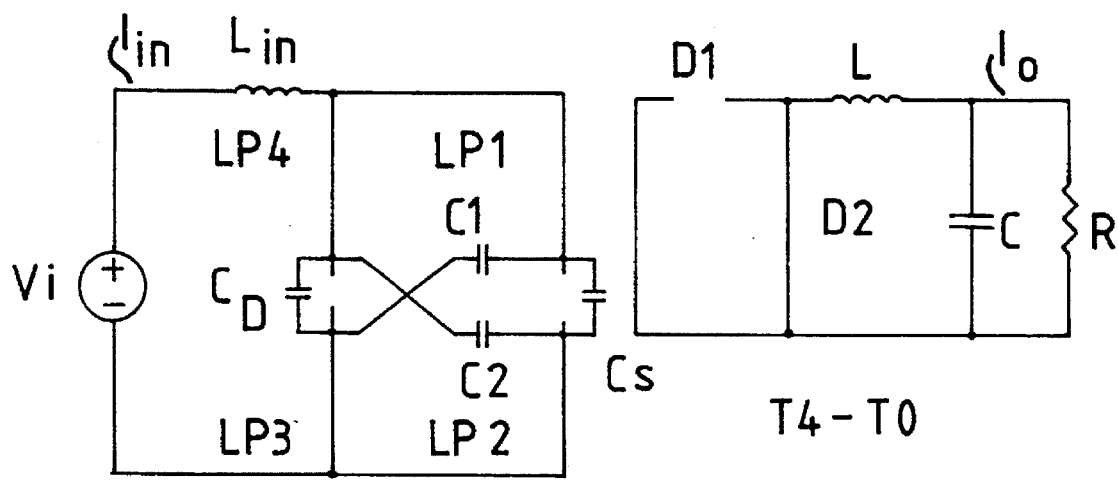
FIG. 7 is a fifth operation stage within one switching cycle of the circuit in FIG. 1.

Referring to FIG. 7, i.e., from time interval $T_4$ to $T_0$, at $T_4$, the voltage $V_{DS}$ reaches $V_i$ and remains constant during this time interval. At $T_0$, the power switch $S_1$ is turned on again, and another switching cycle is started again.

A built-in input filter function takes place in the above manner. Consequently, the input current $I_{in}$ maintains in a non-pulsating shape, decreases its RMS value as well as the ripple, reduces undesired harmonic components, and transfers energy to the load R when the power switch $S_1$ is turned on thereafter. It should be noted that the transformer used in the invention may be a single transformer with four identical primary windings $L_{P1}$, $L_{P2}$, $L_{P3}$, and $L_{P4}$, and a secondary winding $L_{s1}$. Alternatively, the single transformer may be replaced with four identical transformers with an equivalent circuit to the single transformer as shown in FIG. 1.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claim.

I claim:

1. A built-in input filter forward converter comprising in combination:

a split-winding transformer comprising four identical primary windings and a secondary winding, said primary windings being connected to a DC source, said secondary winding being connected to a load;

a power switch connected to said split-winding transformer;

a controller connected to said power switch to alternately and periodically turn on and turn off said power switch;

two cross-coupled capacitors connected to said split-winding transformer;

whereby when said controller turns on said power switch, said cross-coupled capacitors together with said split-winding transformer transfer power to said load; when said controller turns off said power switch, said cross-coupled capacitors together with said split-winding transformer absorb leakage energy and are charged to avoid interrupting the input current from said DC source.

2. A built-in input filter forward converter as claimed in claim 1, wherein said split-winding transformer is a single transformer with four identical primary windings and a secondary winding.

3. A built-in input filter forward converter as claimed in claim 1, wherein said split-winding transformer is a combination of four identical transformers.

\* \* \* \* \*